United States Patent [19]

Busch

[11] Patent Number: 4,577,288
[45] Date of Patent: Mar. 18, 1986

[54] DATA COMMUNICATIONS SYSTEM WITH RECEIVING TERMINAL FOR VARYING THE PORTIONS OF RECEIVED DATA BEING DISPLAYED

[75] Inventor: Dennis G. Busch, Austin, Tex.

[73] Assignee: International Business Machines Corporation, Armonk, N.Y.

[21] Appl. No.: 274,050

[22] Filed: Jun. 16, 1981

[51] Int. Cl.⁴ .............................................. G06F 9/00
[52] U.S. Cl. .................................................. 364/900
[58] Field of Search ............................. 364/200, 900

[56] References Cited

U.S. PATENT DOCUMENTS

| | | | |
|---|---|---|---|
| 3,500,336 | 3/1970 | Cuccio | 340/324 |
| 3,593,310 | 7/1971 | Kievit | 364/200 |
| 3,810,109 | 5/1974 | Morris et al. | 364/200 |
| 3,872,444 | 3/1975 | Cleveland et al. | 364/200 |
| 3,955,188 | 5/1976 | Viswanathan | 340/706 |
| 4,028,681 | 6/1977 | Vittorelli | 364/900 |
| 4,031,518 | 6/1977 | Holloran et al. | 364/900 |
| 4,054,911 | 10/1977 | Fletcher et al. | 358/86 |
| 4,137,564 | 1/1979 | Spencer | 364/200 |
| 4,180,860 | 12/1979 | Driscoll et al. | 364/900 |
| 4,203,107 | 5/1980 | Lovercheck | 340/799 |
| 4,204,206 | 5/1980 | Bakula et al. | 364/900 |
| 4,223,393 | 9/1980 | Abe et al. | 364/900 |
| 4,244,031 | 1/1981 | Izushima et al. | 364/900 |
| 4,266,271 | 5/1981 | Chamoff et al. | 364/200 |
| 4,319,336 | 3/1982 | Anderson et al. | 364/200 |
| 4,330,845 | 5/1982 | Damerau | 364/900 |
| 4,348,739 | 9/1982 | Deaver et al. | 364/900 |
| 4,399,502 | 8/1983 | MacDonald et al. | 364/900 |
| 4,403,301 | 9/1983 | Fessel | 364/900 |
| 4,403,303 | 9/1983 | Howes et al. | 364/900 |
| 4,408,291 | 10/1983 | Gunzberg et al. | 364/900 |
| 4,448,557 | 5/1984 | Horn et al. | 364/900 |

FOREIGN PATENT DOCUMENTS

2048022A 12/1980 United Kingdom .

Primary Examiner—Gareth D. Shaw
Assistant Examiner—John G. Mills
Attorney, Agent, or Firm—J. B. Kraft; J. F. Villella, Jr.

[57] ABSTRACT

A communications system is provided in which at least the receiving terminal is a display terminal. The receiving terminal has the capability of storing substantially more data than just the data the alphanumeric representations of which is being displayed. The data receiving display terminal includes the text storage buffer for storing the received data. The text storage buffer has a capacity greater than just the data being displayed. The receiving terminal also includes apparatus operative during data transmission for displaying only part of the stored received data. The display terminal further includes expedients for selectively designating portions of the displayed received data and apparatus for printing such designated portions.

4 Claims, 9 Drawing Figures

DATA COMMUNICATIONS SYSTEM WITH RECEIVING TERMINAL FOR VARYING THE PORTIONS OF RECEIVED DATA BEING DISPLAYED

TECHNICAL FIELD

This invention relates to communication of data between a transmitting and a remote receiving terminal, and more particularly to a system wherein the terminal receiving transmitted data is a display terminal.

BACKGROUND ART

In the prior art, display terminals have been used as receiving terminals. However, I am aware of no prior art system which had receiving display terminal apparatus permitting the operator to view and work with a history of alphanumeric data beyond the received data actually displayed on the screen. One group of prior art display terminals filled the display screen with the data which was communicated giving the operator an opportunity to view the incoming data. However, as the alphanumeric representations of the data displayed on the screen reached the sequential end of the screen, the operator had the choice of either discarding the associated data representative of the alphanumeric characters leaving the screen or deciding to store such data in a bulk storage means. In both cases, since the alphanumeric representations of the data had left the screen, the operator had no capability of redisplaying this data while the data transmission from the transmitting terminal to the receiving terminal was still going on. If the data was discarded, then the alphanumeric representations could never be redisplayed. On the other hand, if the data was stored in bulk storage means such as diskette memories, such stored data could not be made reavailable to the display terminal until the communication was complete. Thus, the prior art gave the operator no opportunity to examine the alphanumeric history of the received data on a real time basis while transmission was being carried on.

DISCLOSURE OF THE INVENTION

The present invention provides the operator with means for redisplaying previously displayed alphanumeric data representative of the digital data communicated to the receiving display terminal. In other words, the present invention provides a receiving display terminal with text storage means substantially greater than that necessary for the data of which the alphanumeric representations are currently being displayed on the screen. Because of this capacity of this text storage buffer, received data may be redisplayed.

It is important to note that the redisplaying of received data takes place while new data continues to be transmitted from a remote data transmitting terminal to the data receiving display terminal.

With the capability of redisplaying received data, the operator may review a document which is substantially greater in text than what can be displayed on a conventional screen associated with data communication receiving terminal. The system further includes means at the data receiving terminal permitting the operator to selectively designate portions of the displayed received data together with means for printing such designated portions. In this manner, the operator need not have the system print all of the data that is received, but rather examine the whole document and select portions for printing. The designation of portions of received stored data may be effectively carried out through cursor means.

In accordance with another aspect of the invention, the pair of remote display terminals may be each provided with the system of the present invention so that communications may take place back and forth wherein one of the terminals is the receiving terminal and then the other serves as the receiving terminal.

BEST MODE FOR CARRYING OUT THE INVENTION

Figure 1:
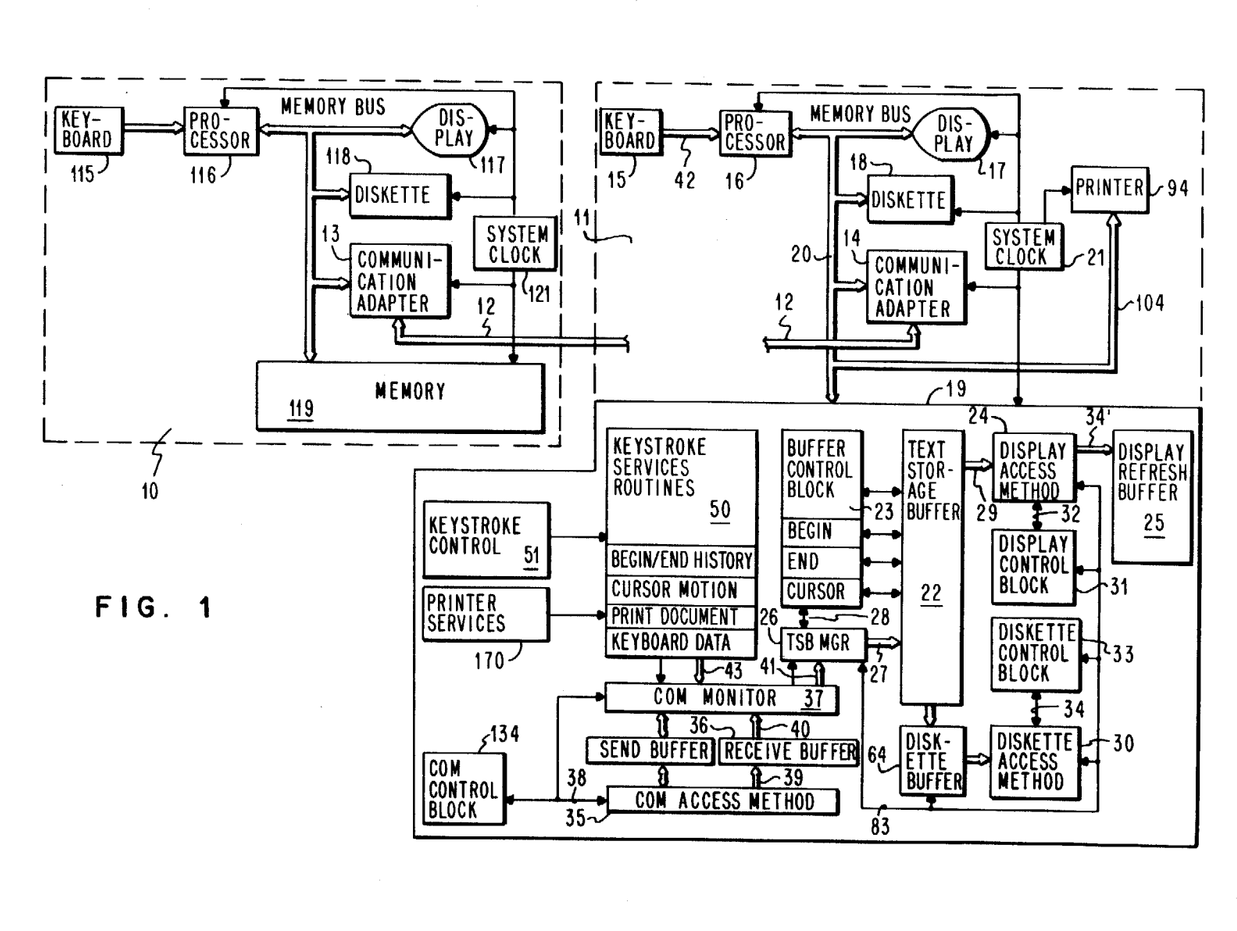
FIG. 1 is a logical block diagram showing the apparatus of the present invention.

With reference to FIG. 1, a communication system in accordance with the present invention is shown. Communication system comprises a first display terminal 10 and a second display terminal 11 remote from said first terminal. For purposes of this description, the first display terminal 10 will be in the transmitting mode and will be referred to as the transmitting terminal while the second terminal 11 will be in the receiving mode and will be referred to as the receiving terminal. The two terminals communicate with each other over a buss 12. Each of the terminals comprises a communication adapter, 13 and 14, each respectively connected to buss 12. The communication adapters may be any standard device having the capability, at the transmitting end, of converting parallel to serial data so that the data may be communicated over external telephone lines and, at the receiving end, for reconverting the received serial data into parallel form so that it may be handled by the receiving display terminal. Such communication adapters will not be described in detail since they are not involved in the present invention which is directed to how transmitted data is handled once it is received at the receiving terminal.

In any event, the mode of communication over buss 12 which represents the link between the two terminals is asynchronous serial communication. The communication adapter which can be used in the present invention is described in detail in copending application D. M. Benignus et al assigned to the assignee of the present invention and identified with Ser. No. 274,300 filed on the same date as the present application. For purposes of describing the communications adapter, said copending application is hereby incorporated by reference.

In the present embodiment, both the transmitting terminal 10 and the receiving terminal 11 are text processing display terminals. The following description, made with respect to the receiving terminal 11, is also substantially applicable to transmitting terminal 10. In receiving display terminal 11, the operator accesses the machine through operator control keys on keyboard 15. The keyboard drives a processor 16. The processor 16 is operably interconnected into a visual display 17, a diskette 18, and a random access memory 19 by a memory buss 20. A system clock 21 is provided for timing functions within display terminal 11.

The information transmitted from display terminal 10 to remote display terminal 11 is serially and asynchronously sent over buss 12 to communications adapter 14. Communications adapter 14 does a serial to parallel conversion of the input data and sends it over memory buss 20 to memory means 19 which has the capability of storing the received data and displaying it on visual display 17 as soon as it is received or at some subsequent time. Memory 19 includes a number of data areas and functional programs for operating with the data input into it through buss 20 from the communications adapter 14. The received data sent to memory 19 from communication adapter 14 over memory buss 20 is stored in text storage buffer 22 sequentially in the order in which it is received. The handling and updating of the data stored in text storage buffer 22 is controlled by routines stored within text storage buffer manager (TSB) block 26. These routines will be subsequently described further. A display access method program 24 controls the formatting of alphanumeric text representative of the stored data on visual display screen 17 through display refresh buffer 25. It should be noted that the display refresh buffer 25 may operate in any conventional manner. However, in the present example, a "BUILD" subroutine is used which is described in copending U.S. patent application Ser. No. 208,568, Filed 11/20/80, W. C. Cason et al.

Text storage buffer (TSB) manager block 26 is connected to text storage buffer 22 by channel 27. The text storage buffer manager block 26 is further connected to buffer control block 23 through a channel 28. As I previously indicated, the data representative of the alphanumeric text characters is input into buffer 22. The data representative of characters is stored sequentially in text storage buffer 22 in the order in which it is received. For convenience in description, this data will be referred to as text character data. In displaying the characters, text character data stored in buffer 22 is communicated to display access method 24 over channel 29. It should be noted that corresponding diskette access method block 30 is used instead of access method block 24 when communication between the text storage buffer 22 and the diskette 18 is desired.

A display control block 31 is connected through a channel 32 with display access method block 24. The corresponding diskette control block 33 communicates with diskette access method block 30 over channel 34 when access to the diskette drive is required.

In any event, as soon as the information from communication adapter 14 is received by the text storage buffer 22, this information is transmitted over channel 29 to display access method 24 and then via channel 34 to display refresh buffer 25. The information stored in display refresh buffer 25 is representative of the actual alphanumeric information shown on display 17. The display control block 31 series to store flags and status information as required by the operation of display access method block 24.

It should be noted that I previously described received data being transferred from the communication adapter 14 to the text storage buffer 22 over buss 20. Actually the process involves several steps. Information from a communication adapter 14 is put on to buss 20 which takes the data to communication access method block 35 under the direction of communication control block 134 after which the data is input over channel 39 to receive buffer 36 and then over channel 40 to communications monitor 37. Information from the communications monitor 37 is input over channel 41 to text storage buffer manager block 26 previously described. Then the data is input to the text storage buffer 22 over channel 27 under the direction of buffer control block 20.

Since the operator controls processes being described through a keyboard 15 communicating through processor 16, standard keyboard entry processes should be described. As the operator enters each key stroke at the keyboard 15, a corresponding signal is transmitted through channel 42 to processor 16 which enters the key stroke command into the memory 19. In the memory, upon the receipt of a key stroke command, a key stroke routine is produced for key stroke service routine block 50 to handle the particular command received. This is carried out under the control of key stroke control block 51. The key stroke command is then processed via channel 43 through communications monitor 37 and channel 41 to the text buffer storage manager block 26 which has the program to control buffer control block 23 to carry out various processes with respect to the data stored in the text storage buffer 22.

Using the hardware just described in FIG. 1, the processes of handling the received data in accordance with the present invention will now be considered.

Figure 2:
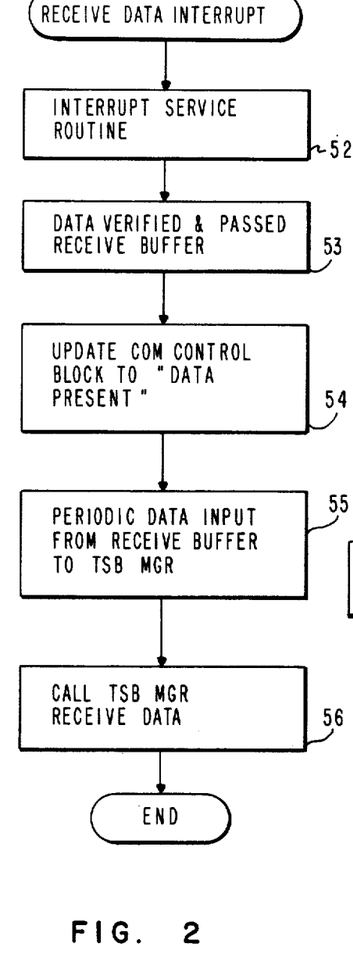
FIG. 2 is a flow chart of the received data interrupt which takes place when data is incoming into the receiving terminal.

Let us assume that transmitting terminal 10 sends data over buss 12 to remote receiving terminal 11. At the time the data is received in communication adapter 14 of receiving terminal 11, let us assume that receiving terminal 14 is a word processing terminal either involved in some other word processing activity or dormant. When the data is received in communications adapter 14, a "Receive Data Interrupt" process shown in the flow chart of FIG. 2 is commenced. An interrupt service routine, step 52 which is stored in the communication access method section 35 of memory 19 commences, and the data from the communication adapter 14 is passed as received over memory buss 20 and buss 20' to communication access method section 35, FIG. 1. The data is verified, step 53, and passed to receive buffer 36 in FIG. 1. At this point, step 54, communication control block 134 is updated via channel 38 to indicate that receive buffer 36 is in a "data present" state. Then, step 55, under the control of communications control block 134, receive buffer 36 is periodically sampled (every hundred milliseconds) and the data present in the buffer is loaded through communications monitor 37 to the text buffer storage (TSB) manager (MGR) block 26. At this point, step 56, FIG. 2, the "TSB MGR Receive Data" routine maintained in communications monitor 37 is called.

Figure 3:
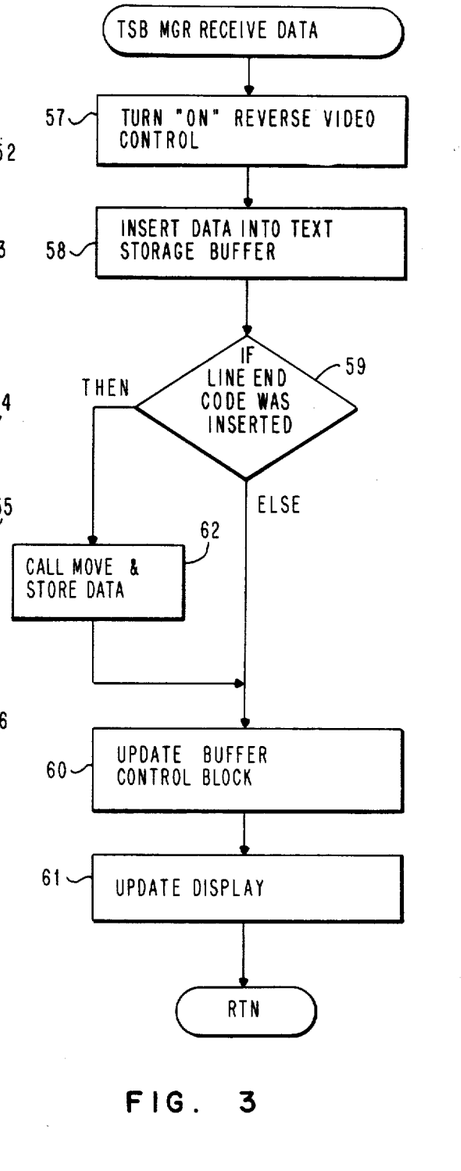
FIG. 3 shows a flow chart of the operations of the text buffer manager apparatus when data is received.

This TSB MGR Receive Data routine is shown in flow chart form in FIG. 3. In describing the flow chart in FIG. 3 and subsequent flow charts, reference will be made to the steps in the routine and if any hardware need be referred to, the reference will be to FIG. 1. In order to distinguish the received data from display data which may have been transmitted or otherwise used in the display terminal 11, in step 57, the reverse video control is turned on by TSB MGR 26 whereby the reverse video image of the received alphanumeric characters will be stored in text storage buffer 22 and consequently displayed through display refresh buffer 25. This is a conventional approach which is not part of the present invention, it is merely used in the apparatus to distinguish received data from other data on the display. Next, step 58, the received data is inserted into the text storage buffer block 22 over channel 27 from TSB MGR 26. Next, step 59, the determination is made as to whether the data has a line end code to indicate the end of a line. If this is not the case, then, step 60, buffer control block 22 is updated to reflect data from receive buffer 36 which has been newly entered into the text storage buffer and, step 61, the display 17 is updated through display access 24 and refresh buffer 25 to reflect the new data.

On the other hand, if in step 59, there was an end of line indicator, then, step 62 a routine "Move and Store Data" is called. For example, in the system being described with respect to FIG. 1, text storage buffer 22 has a capacity of about three times the number of lines which can be displayed on display 17. Thus, any portion of the text storage buffer 22 up to about one-third its capacity can be displayed on display 17 at any one time.

Figure 4:
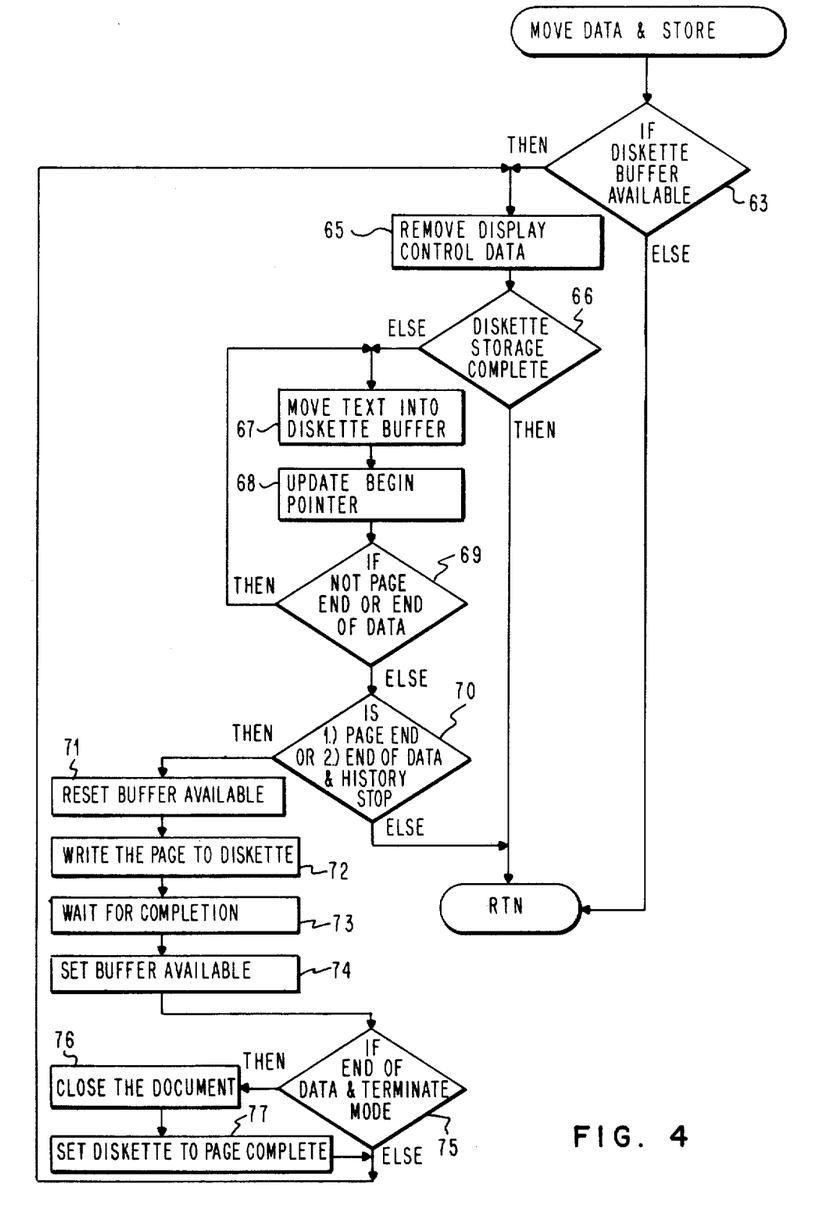
FIG. 4 is a flow chart of the moved data and store operation which moves data from the text storage buffer to the diskette memory.

In any event, the Move Data and Store routine which is shown in FIG. 4 is called. In this routine, a determination is first made (step 63) as to whether or not the diskette buffer is available. The diskette buffer 64 in FIG. 1 would normally be available if the "Begin History Store" routine shown in FIG. 5 has already been carried out. Let us assume for purposes of this description that when decision block 63 is reached, the diskette buffer is available. After the flow chart in FIG. 4 has been described, I will then go back and describe the "Begin History Store" routine of FIG. 5.

In any event, if, step 63, diskette buffer 64 is available, then, step 65, the display control data in text storage buffer 22 is removed under the control of the TSB MGR 26. This data such as highlighting which is only necessary for display purposes, and not necessary for subsequent printing or other data handling from diskette is not stored in the diskette and thus removed. Next, step 66, a determination is made as to whether the diskette storage is complete. This is actually a determination as to whether or not an entry has been made by the Stop History Store routine shown in FIG. 6. This will be stored and reflected in buffer control block 23. If the diskette storage is not complete, step 67 (FIG. 4), the text is moved into the diskette buffer 64 from the text storage buffer 22. The begin pointer in buffer control block 23 is updated, step 68. Then, a determination is made as to whether a page end or an end of data has been reached, step 69. If not then, the procedure is repeated, and the next segment text is moved into the buffer and so on.

On the other hand, if it is determined that there is a page end or end of data by step 69, then, step 70, decision is made as to whether there is (1) a page end or (2) the end of data and a history stop. If either is the case, then, block 71, "buffer available" indicator is reset in the buffer control block 23 and, step 72, the whole page is passed into the diskette from the diskette buffer 64 through the diskette access method 30 under the control of the diskette control block 33. The page is entered via memory buss 20 into diskette 18. Upon the completion of the transfer, step 73, the "buffer available" indicator, step 74, is set in buffer control block 23.

Next, decision step 75, a determination is made if end of data and terminate mode are present. If that is the case, the document is closed, step 76, the diskette is set to "storage complete", step 77 and the routine returned to its initial point.

At the beginning of the above description of the Move Data and Store routine I indicated that I had assumed that the "Begin History Store" routine had already been carried out. If this is not the case, then, after decision step 63 in FIG. 4, control is returned and waits until diskette buffer is available.

Figure 5:
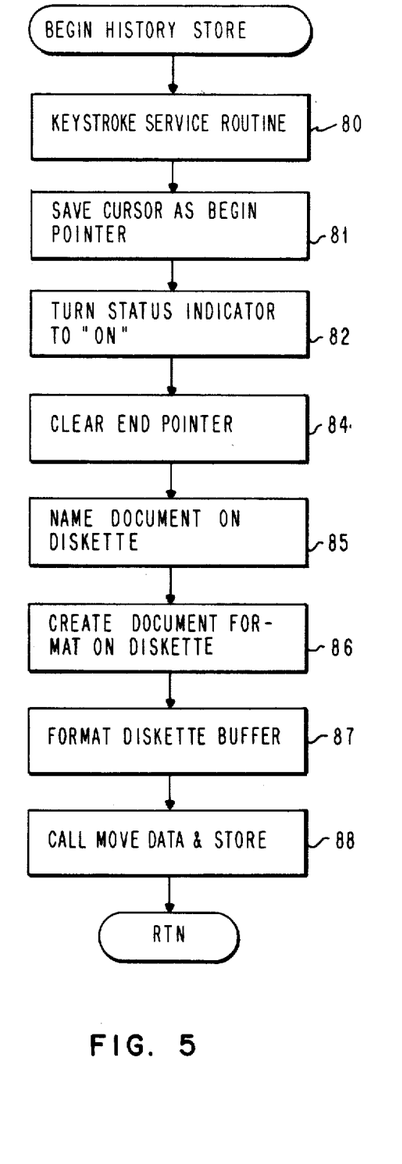
FIG. 5 is a flow chart of the process involved in the selection of the starting point of data from the text storage buffer which is to be stored for a designated use in a diskette memory.

The key stroke service routine in FIG. 5 handles operator input from the keyboard. First, step 80, FIG. 5, key stroke service routine is called through the apparatus of FIG. 1 by the operator entering the keyboard through the processor 16 and key stroke control block 51 which calls for key stroke service routine 50 to begin history. Then, step 81, the cursor point is saved as a begin pointer. This is accomplished by the key stroke service routine through the communication monitor 37 of FIG. 1 which coordinates and synchronizes all activities under this routine. The TSB MGR 26 directs buffer control block 23 to save cursor point as a begin pointer.

Next, step 82, the status indicator on the display is turned on to indicate the history store is taking place. This is accomplished by the key stroke service routine proceeding through communication monitor 37, FIG. 1, to the TSB MGR 26 which is connected to the display access method 24 through channel 83, FIG. 1. The display access method 24 activates the display refresh buffer to have the display refresh buffer 25 cause the display 17 to show this history store indication.

Next, step 84, in FIG. 5 is to clear the end pointer in buffer control block 23. This is again carried out under the key stroke service routine 50 in FIG. 1 through communications monitor and the TSB MGR which controls buffer control block 23. Next, step 85, key stroke service routine 50 designates the name for the document on the diskette. Then, step 86, a document format is created on the diskette. Next, the diskette buffer is formatted with the document format, step 87. This is accomplished under the control of the TSB MGR 26 which communicates with diskette buffer 64 over line 83.

When this is completed, then, step 88, Move Data and Store routine of FIG. 4 is called and the storage of data onto the diskette as previously described may now commence.

Figure 6:
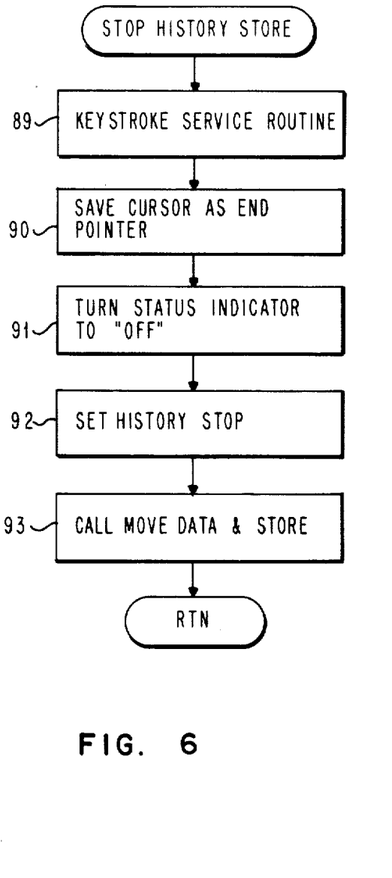
FIG. 6 is a flow chart of the operation involved in designating the end of the data which is to be stored in the diskette memory.

When the operator determines the point at which he wishes to end the storage of his document onto the diskette, he calls on "Stop History Store" routine shown in FIG. 6. This also is a key stroke service routine stored in key stroke service routine block 50 of FIG. 1. The first step, 89, FIG. 6 is to call this key stroke service routine. The first step is to save the end pointer indicating the end of the history, step 90. This is done on the buffer control block 23 through the communications monitor block 37 in FIG. 1 to the TSB MGR 26 which manages control block 23. Then, the status indicator on the display is turned off, step 91, FIG. 6. This is done with the same apparatus which turned the status indicator on (step 82 in FIG. 5). Next, step 92, the history stop status is set in communications monitor 37 under the control of the key stroke service routine 50. At this stage, step 93, the system is returned to the Move Data and Store routine of FIG. 4 so that storage can continue until the history stop point is reached, at which time, storage on the diskette is stopped while communication of data to the receiving terminal 11 may very well continue and continue to be stored in the text storage buffer 22 of FIG. 1.

To summarize, in the key aspects of the present invention which the previously described flow charts have illustrated, one of the principle expedients involves the capability of the present data communication system to store in the text storage buffer substantially more data than is capable of being displayed on the display screen 17. The system further has the capability permitting the operator to then display selected portions of the data which is stored in the text storage buffer and to designate specific portions of the displayed data which are to be subsequently stored on diskettes and optionally printed on a printer such as printer 94 in FIG. 1. It should be noted that all these operations are taking place simultaneously with the communication data from a transmitting terminal to receiving display terminal. In the "Begin History Store" routine of FIG. 5 and the Stop History Store of FIG. 6, there has been described how the cursor positions may be saved and used to designate the beginning and the end of that portion of the data in the text storage buffer 22 of FIG. 1 which is to be saved and put onto diskette storage for future possible printing. Also, in the routine set forth in FIG. 4, there has been described how the data thus designated may be moved from the text storage buffer 22 of FIG. 1 eventually into the diskette storage means 18.

Figure 7:
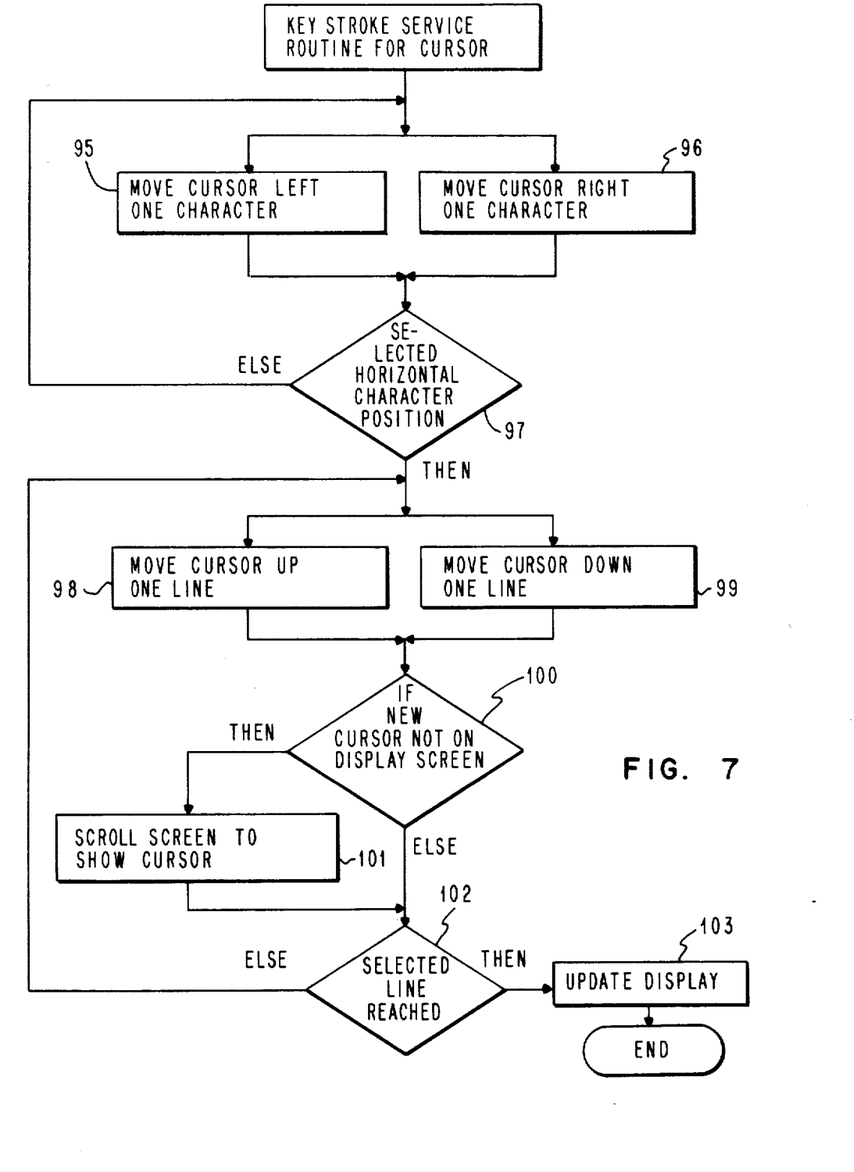
FIG. 7 is a flow chart of the operations involved in a horizontal and vertical movement of the cursor.

Now, with respect to FIG. 7, there will be described the routine for moving the cursor on the display screen to the point selected for the Begin History Store and the Stop History Store. These cursor movements will from time to time extend beyond the display screen boundaries, i.e., the bottom or top of the screen in which case data on screen 17 is scrolled to reach the desired cursor position. The key stroke service routine for cursor movement shown in FIG. 7 is stored in the key stroke services routine section 50 of the memory 19 in FIG. 1. All of the steps involved are carried out through status monitoring of the communications monitor 37 by the TSB MGR 26 of FIG. 1. The TSB MGR 26 controls the cursor movement and its position with respect to text storage buffer 22 through buffer control block 23. The TSB MGR 26 also communicates with the display through channel 83 to the display access method 24 and then to the display refresh buffer 25 which serves to support display 17.

It should be noted that the movement of the cursor shown in FIG. 7 in horizontal and vertical directions need not be carried out in the order shown. However, for convenience in description, I will first describe how horizontal movements are carried out and then how vertical movements are carried out. Thus, the cursor is moved either left or right one character at a time, steps 95 and 96. After each cursor movement a decision is made as to whether the selected character position is reached, step 97. If the position is not reached, routine is reiterated for another character movement. If the position is reached, as indicated by decision step 97, then, vertical movement is commenced by either moving the cursor up one line, step 98, or down one line, step 99, depending on which direction desired for vertical movement.

After each movement, either up one line or down one line, a determination is made as to whether the cursor is not on the display screen, step 100. If the cursor is not on the display screen, the screen is scrolled, step 101, either up or down to again show the cursor. On the other hand, if the cursor is showing after step 100, no scrolling is necessary. After the completion of step 100 or 101, a decision is made, step 102, as to whether or not the selected line position for the cursor has been reached. If the position has been reached, then the display is updated, step 103. If the position has not been reached, the system is looped back and the vertical movement of the cursor reiterated.

Once the data to be saved has been named and stored on the diskette, it is available for printing in printer 94 of FIG. 1 by communicating the data to printer 94, through a conventional printer service program, block 170, from data stored on diskette 18 which is moved over memory buss 20 to printer services 170 in memory 19 under the control of the print document routine in key stroke services 50. Then back to printer through buss 104.

In accordance with a specific aspect of the present invention, it has been previously indicated that display terminal 10 which has been serving as the transmitting terminal in the above description has substantially identical apparatus to display terminal 11. Consequently, the functions of the two terminals may be reversed and display terminal 11 may act as the transmitting terminal while display terminal 10 acts as the receiving terminal. As noted in FIG. 1, display terminal 10 has a keyboard 115, a processor 116, display 117, a diskette 118, a communications adapter 13, a system clock 121 and a memory 119 all serving substantially the same functions as previously described for their corresponding members in display terminal 11.

Figure 9:
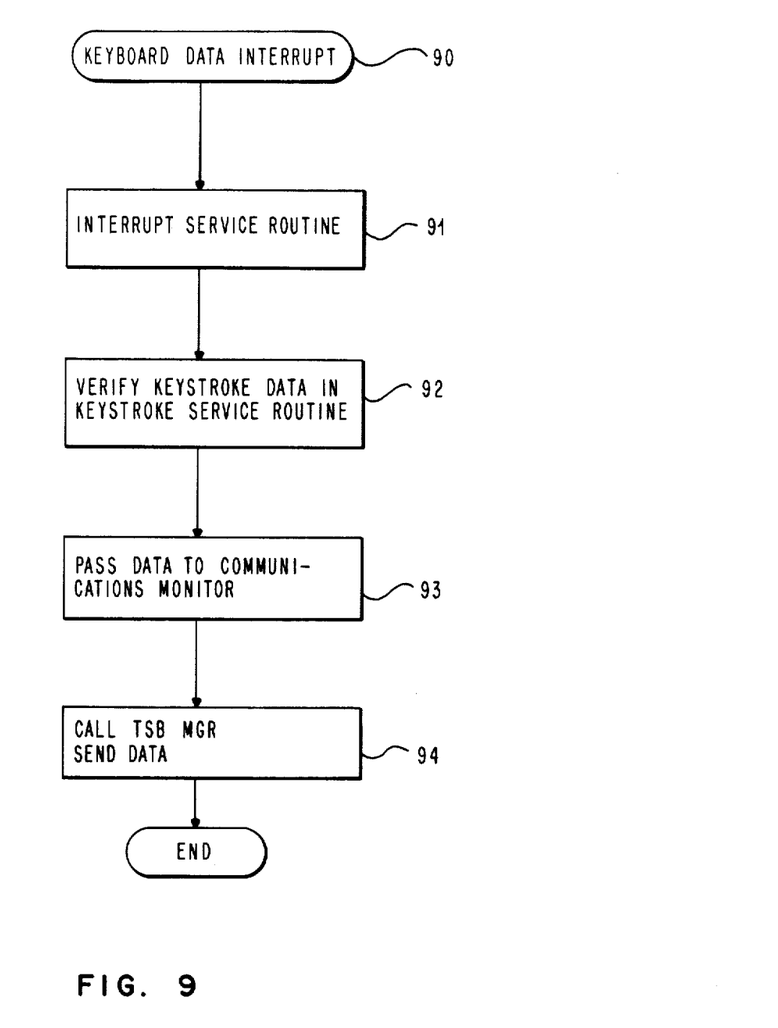
FIG. 9 is a flow chart of the initial operations involved in reversing the display terminal to a sending or receiving terminal. This is carried out prior to the operations in FIG. 8.

It has been indicated hereinabove that display terminal 11 can reverse its function and serve as a transmitting terminal. In order to commence such an operation, a simple routine is first followed which sets up the display terminal for such a reverse operation. With reference to FIG. 9, first there is a keyboard data interrupt, step 90, in which the operator at the keyboard 115 (FIG. 1) indicates that he wishes to interrupt the operation so that he can go into a transmit mode. An interrupt service routine in key stroke control 51 accessed through the keyboard (step 91) takes control and the key stroke data now being entered is verified through key strokes services routine, block 50 (step 92, FIG. 9). The data being entered through the keyboard is passed through key stroke services 50 to communications monitor 37 on buss 43, step 93 and communications monitor calls the send data routine which is controlled by TSB MGR 26 (step 94).

Figure 8:
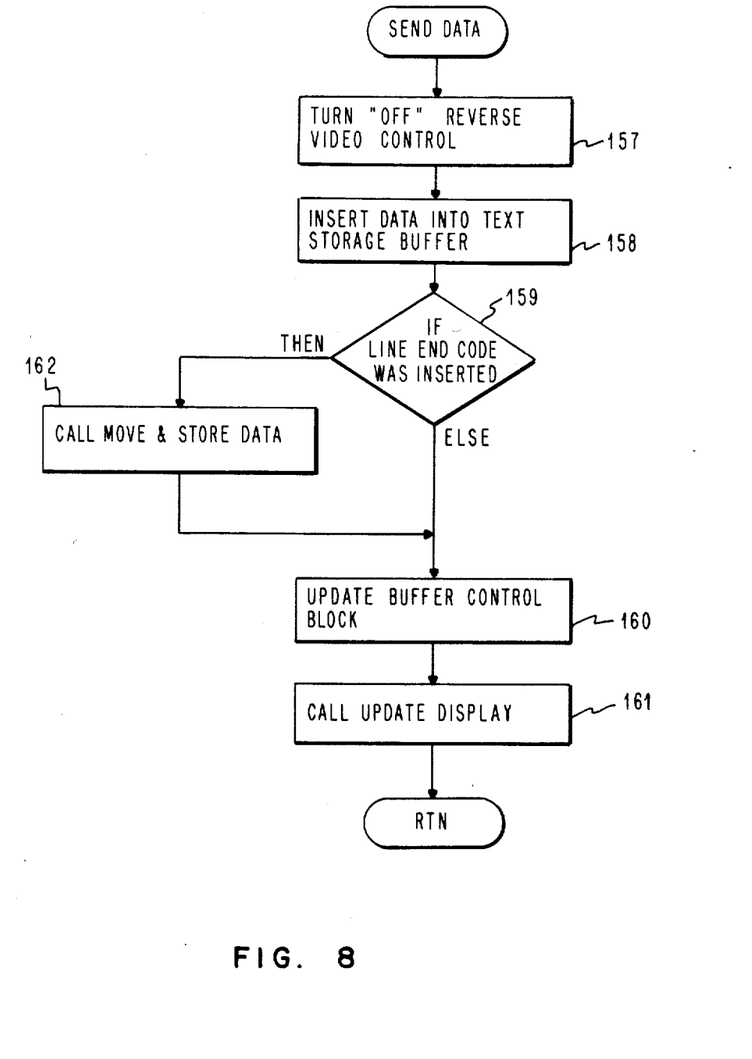
FIG. 8 is a flow chart of the operations involved in the display terminal serving as a sending or transmitting terminal.

At this point the "Send Data" routine is carried out in display terminal 11 as shown in the flow chart of FIG. 8. Please note that the "Send Data" routine shown in FIG. 8 has steps which correspond to the steps of the "Receive Data" routine of FIG. 3 except that the apparatus is in the send mode. The apparatus used to carry out the steps of the Send Data routine of FIG. 8 is substantially the same apparatus used to carry out the steps of the Receive Data routine of FIG. 3, consequently this apparatus will not be again described. First, step 157, the reverse video control is turned off. As has been previously indicated, the reverse video mode on the display indicates receive data while the normal video mode on the display indicates sent data. Next, step 158, the data is inserted into the text storage buffer 22. A determination is made in decision step 159 as to whether the line end code has been present. If this is the case, then, Move and Store Data of FIG. 4 is called in order to move the line from the text storage buffer into the diskette in order to keep track of what has been sent, step 162. Then, step 160, the buffer control block is updated and step 161, the display is updated.

While the invention has been particularly shown and described with reference to a preferred embodiment it will be understood by those skilled in the art that various other changes in form and detail may be made without departing from the spirit and scope of the invention.

I claim:

1. In a data communication system comprising at least one data transmitting display terminal and at least one data receiving display termianl wherein said data receiving display terminal also functions to transmit data and said data transmitting terminal also functions to receive data, the improvement wherein each said data receiving and transmitting display terminal comprises;

means operative during data transmission for storing data received from said at least one data transmitting terminal;

means operation during said data transmission for concurrenty displaying the alphanumeric representation of said received stored data, the screen capacity of the data receiving display terminal being less than that required to display all of said received stored data at a time;

cursor means operative during data transmission for concurrently and selectively designating entire portions of said displayed received data for printing, said cursor means comprising display and control means;

means for concurrently printing said designated portions during said data transmission.

2. The data communications system of claim 1 wherein the means for storing the received data comprises a text storage buffer, and said display means display the alphanumeric representations of a sequential portion of the data sequentially stored in the text storage buffer.

3. In a data communications method between at least one data transmitting terminal and at least one data receiving display terminal, the improvement comprising the following steps carried out in the data receiving display terminal, storing data received from said at least one data transmitting terminal during data transmission, displaying the alphanumeric representations of part of said received stored data during said data transmission, selectively designating for printing, using a cursor, portions of said displayed received data during said data transmission, and printing said designated portions during said data transmission.

4. The data communications method of claim 3 wherein said data transmitting terminal is a display terminal.

* * * * *